F. E. ALLEN.
COMBINED PLOW AND SCRAPER.
APPLICATION FILED OCT. 25, 1911.

1,031,035.

Patented July 2, 1912.

2 SHEETS—SHEET 1.

WITNESSES

INVENTOR

F. E. ALLEN.
COMBINED PLOW AND SCRAPER.
APPLICATION FILED OCT. 25, 1911.
1,031,035.
Patented July 2, 1912.
2 SHEETS—SHEET 2.
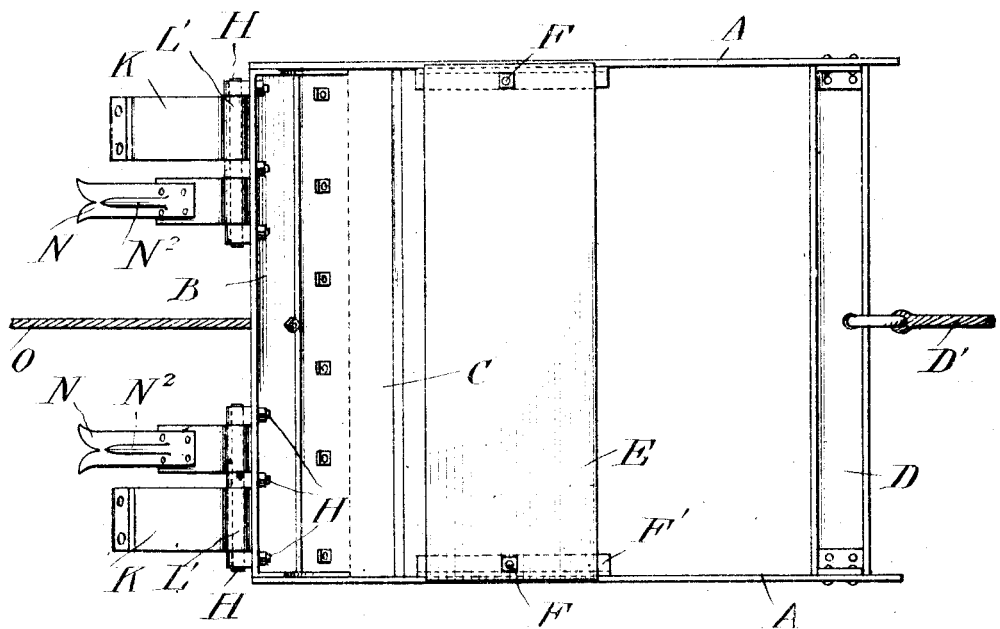
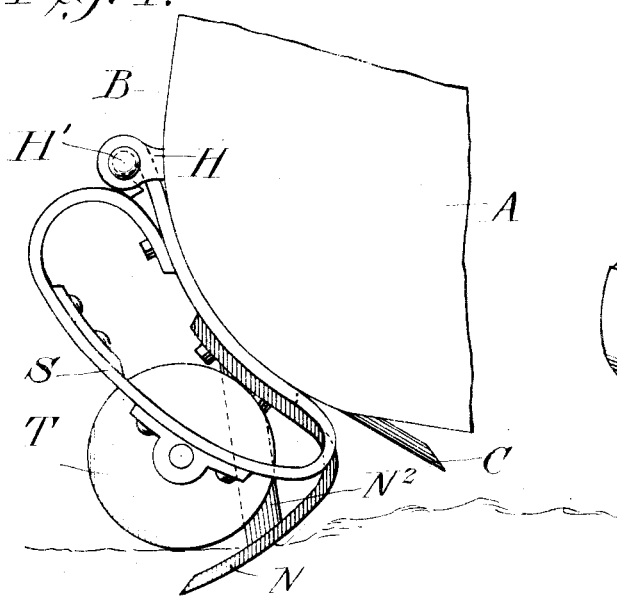

UNITED STATES PATENT OFFICE.

FREDERICK E. ALLEN, OF OAKLAND, CALIFORNIA, ASSIGNOR TO THE INTERNATIONAL EXCAVATOR COMPANY, OF OAKLAND, CALIFORNIA, A CORPORATION OF CALIFORNIA.

COMBINED PLOW AND SCRAPER.

1,031,035.  Specification of Letters Patent.  Patented July 2, 1912.

Application filed October 25, 1911. Serial No. 656,754.

*To all whom it may concern:*

Be it known that I, FREDERICK E. ALLEN, a citizen of the United States, residing at Oakland, in the county of Alameda and State of California, have invented certain new and useful Improvements in Combined Plows and Scrapers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in scrapers and plows adapted for use in excavating, etc.

The invention consists essentially in the employment of plows adapted to break up the ground and of pivotal self-reversing runners or wheels adapted to raise the rear end of the scraper when the apparatus is moved in one direction, the runners reversing on a forward movement of the scraper, permitting the cutting blade to dig into the material previously loosened or broken up.

The invention consists further in various details of construction and combinations and arrangements of parts, which will be hereinafter fully described, shown in the accompanying drawings and then specifically defined in the appended claims.

I illustrate my invention in the accompanying drawings, in which:—

Figure 1:
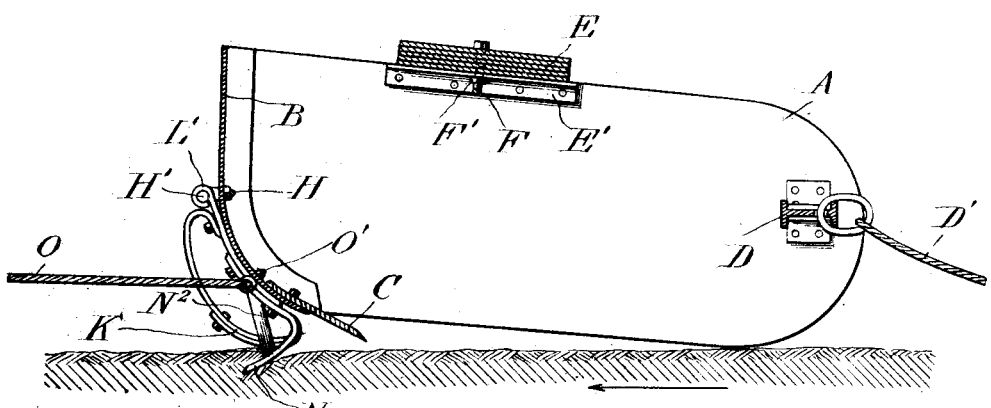
Figure 2:
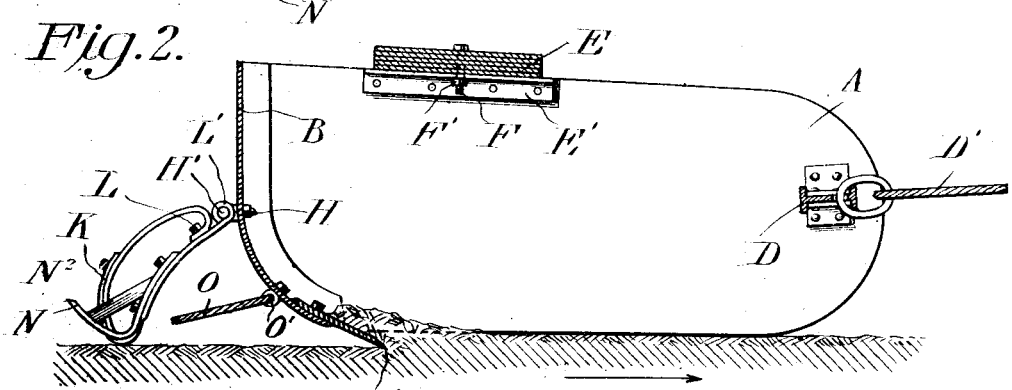
Figure 6:
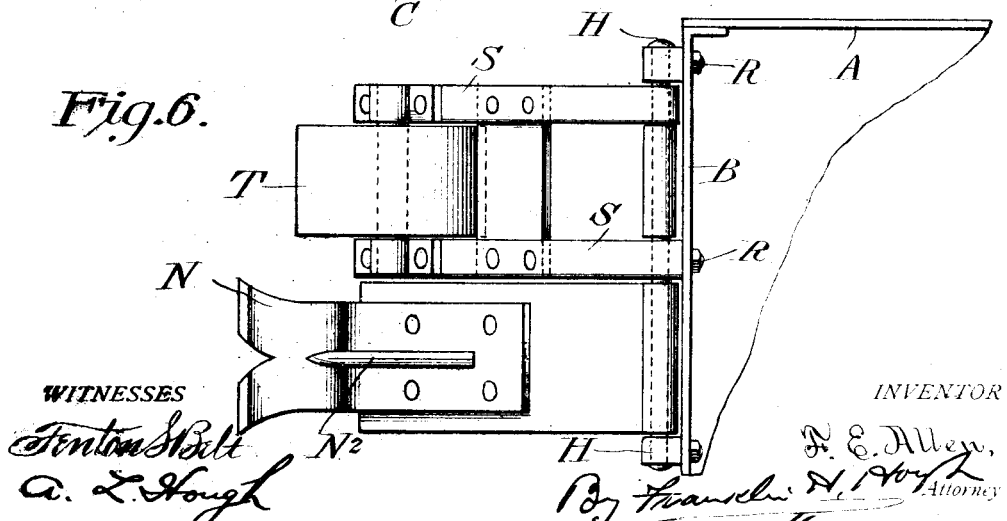

Figure 1 is a vertical sectional view of my improved scraper, showing the position that the plows and runners assume when the apparatus is drawn rearward. Fig. 2 is a similar view in elevation showing the position that the runners and plows assume when the apparatus is adapted to be drawn forward. Fig. 3 is a top plan view. Fig. 4 is a detail in elevation of a modified form of the apparatus in which a wheel is utilized instead of a runner. Fig. 5 is a detail view of the runner and Fig. 6 is an enlarged top plan view of the modified form shown in Fig. 4.

Reference now being had to the details of the drawings by letter, A, A designate the two opposite sides of the scraper apparatus which are connected together at their inner ends by a curved rear portion B, the rearwardly extending portion of which has detachably fastened thereto a scraper plow C. A beam D connects the sides near their forward ends and to which a cable D' is adapted to be fastened in any suitable manner.

In order to weight down the apparatus, detachable weighted members E are mounted in any suitable manner, such as upon the bracket members E' fastened to the opposite sides, and are preferably held in place by means of bolts F passing through registering apertures therein, suitable nuts F' being fitted to the threaded ends of the bolts.

Projecting from the rear curved wall of the scraper are the eye bolts H in which pins H' are mounted and upon said pins are pivotally mounted the runners K, which may be of any desired construction. In the drawings I have shown these runners as made up of curved bars or plates which are bent upon themselves and held together by means of bolts L, one of said plates being turned into a roll as at L', forming a means whereby the runner may be pivotally mounted upon the pin H'. As will be observed upon reference to Fig. 3 of the drawings, I have illustrated two runners mounted one a short distance from each side and mounted similarly upon the rear wall, and intermediate the said runners are the pivotal plows N, each having an eye at the upper end of its shank portion pivotally mounted upon one of said pins and a cutting blade $N^2$ is attached to or integral with the plow and disposed at an angle, as illustrated in the side elevation of the drawings, and presenting a draw cutting edge to the soil when the scraper is drawn rearward by means of the cable O which is fastened to the eye bolt O' upon the rear curved wall of the scraper.

Upon reference to the plan view of the drawings, the plow N is bifurcated, having two cutting edges which flare outwardly, the cutting blade $N^2$ being disposed intermediate the same.

In Fig. 4 of the drawings, I have shown a slight modification of a detail of the invention in which, instead of the runners, I have illustrated a wheel, designated by letter T, and which is mounted in suitable bearings upon the arms S which are pivotally mounted in eye bolts R fastened to the rear curved wall of the scraper.

The operation of my invention will be readily understood and is as follows:—In the event of the scraper being drawn backward or in the direction indicated by the arrow in Fig. 1, the plows N, digging into the ground, will break up the earth, whereas, if the scraper is drawn forward or in the opposite direction, the detachable plow C will have the same effect, filling the area intermediate the plows, it being understood that there is no bottom to the scraper intermediate the sides. In the event of the scraper being drawn rearwardly, its load will remain deposited where left by the forward movement of the scraper. Each time the scraper is drawn rearwardly, the scrapers or the wheel, if used in place thereof, will snugly adjust themselves under the curved rear wall of the scraper, thereby causing the rear end of the same to be raised a slight distance above the ground so that the material loosened by the plows may freely pass out underneath the plow C and not bank up against the rear wall of the scraper. By raising the rear end of the scraper, the weight will come upon the runners or wheel while the apparatus is plowing, thereby lessening the power required. By reason of the weights upon the scraper, the latter may be adjusted to cut at different depths according to the material being worked upon.

What I claim to be new is:—

1. A combined scraper and plow having opposite walls spaced apart and connected by a rear wall, a detachable forwardly extending plow detachably held to said rear wall, a plow pivotally connected to the outer surface of the rear wall, and means for raising the rear end of the scraper as the latter is moved rearwardly, as set forth.

2. A combined scraper and plow having opposite walls spaced apart and connected by a rear wall, a detachable forwardly extending plow detachably held to said rear wall, a plow pivotally connected to the outer surface of the rear wall, and means pivotally connected to the outer surface of the rear wall of the scraper and adapted to raise the latter as it is moved rearwardly, as set forth.

3. A combined scraper and plow having opposite walls spaced apart and connected by a rear wall, a detachable forwardly extending plow detachably held to said rear wall, a plow pivotally connected to the outer surface of the rear wall, runners pivotally connected to the rear wall of the scraper and adapted to raise the rear end of the scraper as it is moved rearwardly, as set forth.

4. A combined scraper and plow having opposite walls spaced apart and connected by a rear wall, a detachable forwardly extending plow detachably held to said rear wall, a plow pivotally connected to the outer surface of the rear wall and having cutting blades projecting therefrom and adapted to present a draw cutting edge to the soil as the scraper is moved rearwardly, and means for automatically raising the scraper as the latter is moved rearwardly, as set forth.

5. A combined scraper and plow having opposite walls spaced apart and connected by a rear wall, a detachable forwardly extending plow detachably held to said rear wall, a plow pivotally connected to the outer surface of the rear wall and having a curved shank portion conforming to the curved rear wall of the scraper, and means pivoted to the rear wall of the scraper and adapted to raise the rear part of the scraper as it is moved backward, as set forth.

6. A combined scraper and plow having opposite walls spaced apart and connected by a rear wall, a detachable forwardly extending plow detachably held to said rear wall, a plow pivotally connected to the outer surface of the rear wall and having a curved shank portion conforming to the rear wall of the scraper, a runner, eyebolts pivotally mounted upon the rear wall and curved to conform to the curved wall of the scraper against which it is adapted to frictionally contact to raise the rear end of the scraper as it is moved backward, as set forth.

In testimony whereof I hereunto affix my signature in the presence of two witnesses.

FREDERICK E. ALLEN.

Witnesses:
R. J. HOUGH,
RALPH L. KAISER.